US009344252B2

(12) United States Patent
Terry et al.

(10) Patent No.: US 9,344,252 B2
(45) Date of Patent: *May 17, 2016

(54) USER EQUIPMENT USING HYBRID AUTOMATIC REPEAT REQUEST

(71) Applicant: Intel Corporation, Santa Clara, CA (US)

(72) Inventors: Stephen E. Terry, Northport, NY (US); Ariela Zeira, Huntington, NY (US); Nader Bolourchi, Elizabeth, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,123

(22) Filed: Jun. 11, 2014

(65) Prior Publication Data

US 2014/0293999 A1    Oct. 2, 2014

Related U.S. Application Data

(63) Continuation of application No. 13/722,798, filed on Dec. 20, 2012, now Pat. No. 8,756,471, which is a continuation of application No. 13/311,148, filed on Dec. 5, 2011, now Pat. No. 8,341,482, which is a (Continued)

(51) Int. Cl.
*H04L 5/00* (2006.01)
*H04L 1/00* (2006.01)
(Continued)

(52) U.S. Cl.
CPC ............ *H04L 5/0055* (2013.01); *H04L 1/0003* (2013.01); *H04L 1/1812* (2013.01);
(Continued)

(58) Field of Classification Search
CPC ... H04L 1/0003; H04L 1/0009; H04L 1/1812; H04L 5/0055; H04L 1/1893; H04L 27/2608; H04L 1/1845; H04W 72/04

USPC .......................................... 714/748; 370/470
See application file for complete search history.

(56) References Cited

U.S. PATENT DOCUMENTS 6,208,663 B1    3/2001    Schramm et al.
6,212,240 B1    4/2001    Scheibel, Jr. et al.
(Continued)

FOREIGN PATENT DOCUMENTS

CN    1290080    4/2001
CN    1290080 A    4/2001
(Continued)

OTHER PUBLICATIONS

Nortel Networks, et al., Stand-alone DSCH, proposed text for inclusion in TR25.848 v0.4.0,3GPP TSG1#19(01)0293, Feb. 2001, URL, http://www.3gpp.org/ftp/tsg_ran/WG1_RL1/TSGR1_19/Docs/Zips/R1-01-0293.zip.

(Continued)

*Primary Examiner* — Cynthia Britt
(74) *Attorney, Agent, or Firm* — Schwabe, Williamson & Wyatt, P.C.

(57) ABSTRACT

A user equipment comprises a transmitter and an adaptive modulation and coding controller. The transmitter is configured to transmit data over an air interface in a single transmission time interval with a first specified modulation and coding scheme, where the single transmission time interval has a plurality of transport block sets. In response to receiving a repeat request for retransmission of at least one particular transport block set, the transmitter retransmits the at least one of the particular transport block sets. The adaptive modulation and coding controller is configured to change the specified modulation and coding scheme to a second specified modulation and coding scheme, enabling a combining of a particular transport block set transmitted at the first specified modulation and coding scheme with a retransmitted version of the particular transport block set transmitted at the second specified modulation and coding scheme.

17 Claims, 7 Drawing Sheets

Related U.S. Application Data continuation of application No. 11/975,749, filed on Oct. 22, 2007, now Pat. No. 8,074,140, which is a continuation of application No. 10/279,393, filed on Oct. 24, 2002, now Pat. No. 7,287,206.

(60) Provisional application No. 60/357,224, filed on Feb. 13, 2002.

(51) Int. Cl.
  *H04L 1/18* (2006.01)
  *H04W 72/04* (2009.01)
  *H04L 27/26* (2006.01)

(52) U.S. Cl.
  CPC ............ *H04L1/1845* (2013.01); *H04L 1/1893* (2013.01); *H04W 72/04* (2013.01); *H04L 1/0009* (2013.01); *H04L 27/2608* (2013.01)

(56) References Cited

U.S. PATENT DOCUMENTS

| | | | |
|---|---|---|---|
| 6,307,867 | B1 | 10/2001 | Roobol et al. |
| 6,308,294 | B1 | 10/2001 | Ghosh et al. |
| 6,314,541 | B1 | 11/2001 | Seytter et al. |
| 6,594,791 | B2 | 7/2003 | Sipola |
| 6,697,347 | B2 | 2/2004 | Ostman et al. |
| 6,704,898 | B1 | 3/2004 | Furuskar et al. |
| 6,842,445 | B2 | 1/2005 | Ahmavaara et al. |
| 6,999,432 | B2 | 2/2006 | Zhang et al. |
| 7,178,089 | B1 | 2/2007 | Frenger et al. |
| 7,287,206 | B2 | 10/2007 | Terry et al. |
| 8,074,140 | B2 | 12/2011 | Terry et al. |
| 8,756,471 | B2 * | 6/2014 | Terry et al. ............... 714/748 |
| 2001/0020285 | A1 | 9/2001 | Fujiwara et al. |
| 2001/0056560 | A1 | 12/2001 | Khan et al. |
| 2002/0071407 | A1 | 6/2002 | Koo et al. |
| 2003/0039226 | A1 | 2/2003 | Kwak |

FOREIGN PATENT DOCUMENTS

| | | |
|---|---|---|
| CN | 1332540 | 1/2002 |
| CN | 1332540 A | 1/2002 |
| CN | 2662570 | 12/2004 |
| CN | 2662570 Y | 12/2004 |
| JP | 05091091 | 4/1993 |
| JP | H06232871 | 8/1994 |
| JP | 08084162 | 3/1996 |
| JP | 10247955 | 9/1998 |
| JP | 1998233758 | 9/1998 |
| JP | 11331296 | 11/1999 |
| JP | 2000188609 | 7/2000 |
| JP | 2001516177 | 9/2001 |
| JP | 2002521936 | 7/2002 |
| JP | 2002537722 | 11/2002 |
| JP | 2005518141 | 6/2005 |
| WO | WO-9912303 | 3/1999 |
| WO | WO-0005911 | 2/2000 |
| WO | WO-0025469 | 5/2000 |
| WO | WO-0033502 | 6/2000 |
| WO | WO-0049760 | 8/2000 |

OTHER PUBLICATIONS

Office Action for Japanese Patent Application No. 2013-208233 mailed Sep. 9, 2014, 7 pages.
Office Action for Japanese Patent Application No. 2011-257344 mailed Sep. 2, 2014, 4 pages.
Final Office Action for Japanese Patent Application No. 2013-093080 mailed Dec. 9, 2014, 6 pages.
Final Office Action for Japanese Patent Application No. 2013-093078 mailed Dec. 9, 2014, 6 pages.
Office Action for Japanese Patent Application No. 2013-103537 mailed Feb. 3, 2015, 6 pages.
Nortel Networks, et al., Stand-alone DSCH, proposed text for inclusion in TR25.848 v0.4.0, 3GPP TSG1#19(01)0293, Feb. 2001, URL, http://www.3gpp.org/ftp/tsg_ran/WG1_RL1/TSGR1_19/Docs/Zips/R1-01-0293.zip.
Notice of Allowance for Malaysian Patent Application No. PI20080055 mailed Jun. 13, 2014, 4 pages.
Office Action for Malaysian Patent Application No. PI20080055 mailed Jun. 8, 2012, 3 pages.
Office Action for Chinese Patent Application No. 201210012334.1, mailed Jul. 21, 2014, 10 pages.
Non-Final Office Action for U.S. Appl. No. 13/722,798 mailed Jun. 20, 2013, 9 pages.
Final Office Action for U.S. Appl. No. 13/722,798 mailed Oct. 23, 2013, 9 pages.
Notice of Allowance for U.S. Appl. No. 13/722,798 mailed Feb. 18, 2014, 5 pages.
Suk Won Kim; Dong-Sam Ha; Jeong Ho Kim; Jung Hwan Kim, "Performance of smart antennas with adaptive combining at handsets for the 3GPP W-CDMA system," Vehicular Technology Conference, 2001. VTC 2001 Fall. IEEE VTS 54th, vol. 4, No. pp. 2048,2052 vol. 4, 20.
Hayoung Yang; Kim, Jooeung; Bubjoo Kang; Daesik Hong; Kang, Changeon, "An adaptive channel precoded space-time transmitter for 3GPP TDD system," Global Telecommunications Conference, 2001. GLOBECOM '01. IEEE, vol. 1, No. p. 529,532 vol. 1, 2001.
Non-Final Office Action for U.S. Appl. No. 13/311,148 mailed May 23, 2012, 13 pages.
Notice of Allowance for U.S. Appl. No. 13/311,148 mailed Aug. 21, 2012, 5 pages.
Non-Final Office Action for U.S. Appl. No. 11/975,749 mailed Jun. 8, 2011, 7 pages.
Notice of Allowance for U.S. Appl. No. 11/975,749 mailed Sep. 14, 2011, 5 pages.
Brito, J.M.C.; Bonatti, I.S.; "An analytical comparison among adaptive modulation, adaptive FEC, adaptive ARQ and hybrid systems for wireless ATM networks," Wireless Personal Multimedia Communications, 2002. The 5th International Symposium on, vol. 3, No., pp. 1034-1038 vol. 3, Oct. 27-30, 2002 doi: 10.1109/WPMC.2002.1 088335.
Naijoh, M.; Sampei, S.; Morinaga, N.; Kamio, Y.;"ARQ schemes with adaptive modulation/TDMA/TDD systems for wireless multimedia communication services," Personal, Indoor and Mobile Radio Communications, 1997. 'Waves of the Year 2000'. PIMRC '97. The 8th IEEE International Symposium on, vol. 2, No., pp. 709-713 vol. 2, Sep. 1-4, 1997doi: 10.1109/PIM.
Non-Final Office Action for U.S. Appl. No. 10/279,393 mailed May 22, 2003, 11 pages.
Non-Final Office Action for U.S. Appl. No. 10/279,393 mailed Nov. 19, 2003, 9 pages.
Non-Final Office Action for U.S. Appl. No. 10/279,393 mailed May 17, 2005, 11 pages.
Non-Final Office Action for U.S. Appl. No. 10/279,393 mailed May 19, 2006, 14 pages.
Final Office Action for U.S. Appl. No. 10/279,393 mailed May 4, 2004, 10 pages.
Notice of Allowance for U.S. Appl. No. 10/279,393 mailed Aug. 9, 2007, 4 pages.
Notice of Allowance for U.S. Appl. No. 10/279,393 mailed Apr. 2, 2007, 4 pages.
Supplemental Notice of Allowability for U.S. Appl. No. 10/279,393 mailed Sep. 18, 2007, 6 pages.
Advisory Action for U.S. Appl. No. 10/279,393 mailed Sep. 9, 2004, 4 pages.
3GPP, "3rd Generation Partnership Project; Specification Group Radio Access Network; Multiplexing and channel coding (FOD) (Release 5)," 3GPP TS 25.212 V5.2.0 (Sep. 2002).
3GPP, "3rd Generation Partnership Project; Technical Specification Group Radio Access Network; Multiplexing and channel coding (FOD) (Release 1999)," 3GPP TS 25.212 V3.11.0 (Sep. 2002).
3GPP, "3rd Generation Partnership Project; Technical Specification Group Radio Access Network; Multiplexing and channel coding (FOD) (Release 4)," 3GPP TS 25.212 V4.6.0 (Sep. 2002).

(56) References Cited

OTHER PUBLICATIONS

3GPP, "3rd Generation Partnership Project; Technical Specification Group Radio Access Network; High Speed Downlink Packet Access (HSDPA); Overall description; Stage 2 (Release 5)," 3GPP TS 25.308 V5.2.0 (Mar. 2003).

3GPP, "3rd Generation Partnership Project; Technical Specification Group Radio Access Network; High Speed Downlink Packet Access (HSDPA); Overall description; Stage 2 (Release 5)," 3GPP TS 25.308 V5.1.0 (Dec. 2001).

3GPP, "3rd Generation Partnership Project; Technical Specification Group Radio Access Network; Multiplexing and channel coding (FOD) (Release 1999)," 3GPP TS 25.212 V3.8.0 (Dec. 2001).

3GPP, "3rd Generation Partnership Project; Technical Specification Group Radio Access Network; Physical layer procedures (FOD) (Release 1999)," 3GPP TS 25.214 V3.9.0 (Dec. 2001).

3GPP, "3rd Generation Partnership Project; Technical Specification Group Radio Access Network; Physical layer procedures (FOD) (Release 1999)," 3GPP TS 25.214 V3.11.0 (Sep. 2002).

3GPP, "3rd Generation Partnership Project; Technical Specification Group Radio Access Network; Physical layer procedures (FOD) (Release 4)," 3GPP TS 25.214 V4.3.0 (Dec. 2001).

3GPP, "3rd Generation Partnership Project; Technical Specification Group Radio Access Network; Physical layer procedures (FOD) (Release 4)," 3GPP TS 25.214 V4.5.0 (Sep. 2002).

3GPP, "3rd Generation Partnership Project; Technical Specification Group Radio Access Network; Physical layer procedures (FOD) (Release 5)," 3GPP TS 25.214 V5.2.0 (Sep. 2002).

Atarashi et al. "Partial Frequency ARQ for Multi-Carrier Modulation," Technical Report of the IEICE, vol. 94, No. 108, pp. 67-72 (1994).

Castro, "The UMTS Network and Radio Access Technology," John Wiley and Sons, Ltd. p. 150-151, 164, and 175 (2001).

Eriksson et al. "Comparison of Link Quality Control Strategies for Packet Data Services in EDGE", Vehicular Technology Conference, IEEE, vol. 2, 1999, pp. 938-942.

ETSI, "Universal Mobile Telecommunications System (UMTS); Multiplexing and channel coding (FOD) (3GPP TS 25.212 version 4.3.0 Release 4)," ETSI TS 125212 V4.3.0 (Dec. 2001).

Molkdar et al. "An Overview of EGPRS: The Packet Data Component of EDGE", Electronics and Communication Engineering Journal, Institution of Electrical Engineers, London, GB, vol. 14, No. 1, Feb. 2002, pp. 21-38.

Nortel Networks et al. "Stand-alone DSCH, proposed text for inclusion in TR 25.848 VOA.O," TSGRAN Working Group 1 meeting #19, TSGR1#19(01)0293 (Feb. 27-Mar. 3, 2001).

Nortel Networks, "Discussion on ARQ aspects for High Speed Downlink Packet Access," TSG-RAN Working Group1 meeting #17, TSGR1#17(00)1442 (Nov. 21-24, 2000).

Parkvall et al. "The high speed packet data evolution of WCDMA," IEEE International Symposium on Personal Indoor and Mobile Radio Communications, Vol.2, pp. 27-31 (Sep. 2001).

Sawahashi et al. "Improvements in W-CDMA: Principles and Experimental Results," Annals of Telecommunications, vol. 56, No. 5/06 (May 2001).

Office Action for Chinese Patent Application No. 201210012402.4 mailed Jul. 21, 2014, 10 pages.

Office Action for Chinese Patent Application No. 201210012472.X mailed Sep. 17, 2014, 11 pages.

Office Action for Chinese Patent Application No. 201210012402.4, mailed Nov. 5, 2013, 10 pages.

Office Action for Chinese Patent Application No. 201210012334.1, mailed Nov. 5, 2013, 10 pages.

Office Action for Japanese Patent Application No. 2011-257344, mailed Nov. 19, 2013, 3 pages.

Office Action for Chinese Application No. 201210012472.X, mailed Jan. 6, 2014, 8 pages.

First Office Action for Japanese Patent Application No. 2013-093078 mailed Mar. 11, 2014, 6 pages.

Nobuhiko Miki et al. "Soft-Decision Replica Suitable for Combination-Type HARQ Mechanism for Transmitting Packets in Downlink High Speed Packet Transmission," 7 pages.

First Office Action for Japanese Patent Application No. 2013-093080 mailed Mar. 11, 2014, 6 pages.

First Office Action for Japanese Patent Application No. 2013-103537 mailed Apr. 1, 2014, 8 pages.

Hiroyuki, Atarashi et al., "Partial Frequency ARQ for Multi-Carrier Modulation", IEICE technical report vol. 94, No. 108, p. 67-72, published in Japan 1994.

Office Action for Chinese Patent Application No. 201210012334.1, mailed Feb. 10, 2015, 14 pages.

Office Action for Chinese Patent Application No. 201210012402.4 mailed Feb. 11, 2015, 14 pages.

Office Action issued May 29, 2015 from Malaysian Patent Application No. PI200030478.

Final Rejection issued Jul. 28, 2015 from Japanese Divisional Application No. 2011-257344.

Final Rejection issued Jul. 7, 2015 from Japanese Divisional Application No. 2013-208233.

Office Action issued Aug. 18, 2015 from Japanese Patent Application No. 2013-093080.

Office Action issued Dec. 22, 2015 from Japanese Divisional Application No. 2013-103537, 6 pages.

Office Action issued Jan. 15, 2016 from Malaysian Divisional Application No. PI 2012003808, 3 pages.

* cited by examiner

USER EQUIPMENT USING HYBRID AUTOMATIC REPEAT REQUEST

CROSS REFERENCE TO RELATED APPLICATIONS

This application is a continuation of U.S. patent application Ser. No. 13/722,798 filed Dec. 20, 2012, which is pending, which is a continuation of U.S. patent application Ser. No. 13/311,148 filed Dec. 5, 2011, which issued on Dec. 25, 2012 as U.S. Pat. No. 8,341,482, which is a continuation of U.S. patent application Ser. No. 11/975,749, filed Oct. 22, 2007, which issued on Dec. 6, 2011 as U.S. Pat. No. 8,074,140, which is a continuation of U.S. patent application Ser. No. 10/279,393, filed Oct. 24, 2002, which issued on Oct. 23, 2007 as U.S. Pat. No. 7,287,206, which claims priority to U.S. Provisional Application No. 60/357,224, filed Feb. 13, 2002, the contents of which are hereby incorporated by reference herein.

This invention generally relates to wireless communication systems. In particular, the invention relates to transmission of data in such systems where adaptive modulation & coding (AMC) and hybrid automatic repeat request (H-ARQ) techniques are applied.

In wireless communication systems, such as the third generation partnership project (3GPP) time division duplex (TDD) or frequency division duplex (FDD) communication systems using code division multiple access (CDMA) or orthogonal frequency division multiplex (OFDM) systems, AMC is used to optimize the use of air resources.

The modulation and coding schemes (sets) used to transmit data are varied based on wireless channel conditions. To illustrate, a type of error encoding (such as turbo versus convolutional coding), coding rate, spreading factor for CDMA system, modulation type (such as quadrature phase shift keying versus M-ary quadrature amplitude modulation), and/or adding/subtracting sub-carriers for an OFDM system may change. If channel characteristics improve, a lower data redundancy and/or "less robust" modulation and coding set is used to transfer data. As a result, for a given allocation of radio resources, more user data is transferred resulting in a higher effective data rate. Conversely, if channel characteristics degrade, a higher data redundancy more "robust" modulation and coding set is used, transferring less user data. Using AMC, an optimization between air resource utilization and quality of service (QOS) can be better maintained.

Data in such systems is received for transfer over the air interface in transmission time intervals (TTIs). Data within a TTI transferred to a particular user equipment is referred to as a transport block set (TBS). For a particular allocation of air resources, a less robust modulation and coding set allows for larger TBS sizes and a more robust modulation and coding set only allows for smaller TBS sizes. As a result, the modulation and coding set for a given radio resource allocation dictates the maximum size of the TBS that can be supported in a given TTI.

In such systems, a hybrid automatic repeat request (H-ARQ) mechanism may be used to maintain QOS and improve radio resource efficiency. A system using H-ARQ is shown in FIG. 1. A transmitter 20 transmits a TBS over the air interface 24 using a particular modulation and coding set. The TBS is received by a receiver 26. An H-ARQ decoder 30 decodes the received TBS. If the quality of the received data is unacceptable, an ARQ transmitter 28 requests a retransmission of the TBS. One approach to check the quality of the received TBS is a cyclic redundancy check (CRC). An ARQ receiver 22 receives the request and a retransmission of the TBS is made by the transmitter 20. Retransmissions may apply a more robust modulation and coding set to increase the possibility of successful delivery. The H-ARQ decoder 30 combines, the received TBS versions. A requirement for combining is that combined TBSs are identical. If the resulting quality is still insufficient, another retransmission is requested. If the resulting quality is sufficient, such as the combined TBS passes the CRC check, the received TBS is released for further processing. The H-ARQ mechanism allows for data received with unacceptable quality to be retransmitted to maintain the desired QOS.

In a system using both H-ARQ and AMC, a change in modulation and coding set may be determined necessary to achieve successful delivery of a requested TBS retransmission. In this situation, the maximum amount of physical data bits allowed within the TTI varies with the modulation and coding set.

Since only one TBS exists per TTI the effective user data rate corresponds to the TBS size applied to each TTI To achieve maximum data rates the largest TBS size is applied to the least robust modulation and coding set within the TTI When wireless channel conditions require a more robust modulation and coding set for successful transmission, such as when a TBS size cannot be supported within the TTI. Therefore, when operating at the maximum data rate, each time a more robust modulation and coding requirement is realized, all outstanding transmissions in H-ARQ processes that have not been successfully acknowledged must be discarded.

When Incremental Redundancy (IR) is applied, TBS data must remain constant in retransmissions for proper combining. Therefore, to guarantee that a TBS retransmission can be supported at a more robust modulation and coding set then the initial transmission, the TBS size used must correspond to the most robust MCS. However, when a TBS size allowed by the most robust modulation and coding set is applied the maximum data rate to the mobile is reduced, and when a less robust modulation and coding set is applied physical resources are not fully utilized.

When the TBS size is not supported by the more robust modulation and coding set, the TBS can be retransmitted using the old modulation and coding set. However, if the channel conditions dictate that a more robust modulation and coding set be used or the initial transmission was severally corrupted, the combining of the retransmitted TBSs may never pass, resulting in a transmission failure.

In current implementations, when a TBS cannot be successfully transmitted by AMC & H-ARQ mechanisms, recovery is handled by the radio link control (RLC) protocol (at layer two). Unlike a H-ARQ recovery of failed transmissions, the RLC error detection, data recovery and buffering of a TBS queued in the node-B, results in increased block error rates and data latency, potentially resulting in a failure to meet QOS requirements.

Accordingly, to provide maximum data rates with minimal H-ARQ transmission failures, it is desirable to support incremental redundancy and allow adaptation of modulation and coding sets in such systems.

SUMMARY

A user equipment comprises a transmitter and an adaptive modulation and coding controller. The transmitter is configured to transmit data over an air interface in a single transmission time interval with a first specified modulation and coding scheme, where the single transmission time interval has a plurality of transport block sets. In response to receiving a repeat request for retransmission of at least one particular transport block set, the transmitter retransmits the at least one of the particular transport block sets. The adaptive modulation and coding controller is configured to change the specified modulation and coding scheme to a second specified modulation and coding scheme, enabling a combining of a particular transport block set transmitted at the first specified modulation and coding scheme with a retransmitted version of the particular transport block set transmitted at the second specified modulation and coding scheme.

DETAILED DESCRIPTION OF THE PREFERRED EMBODIMENTS

Figure 1:
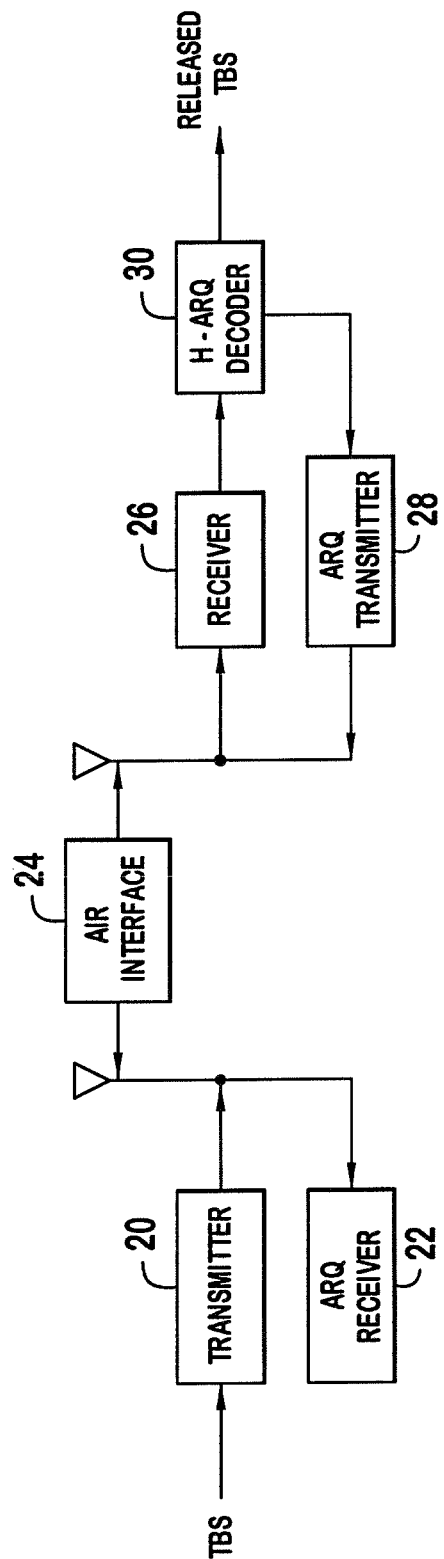
FIG. 1 is an embodiment of a wireless H-ARQ communication system.
Figure 2A:
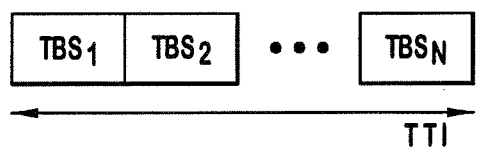
FIGS. 2A-2D are illustrations of a TTI having multiple TBSs.
Figure 2B:
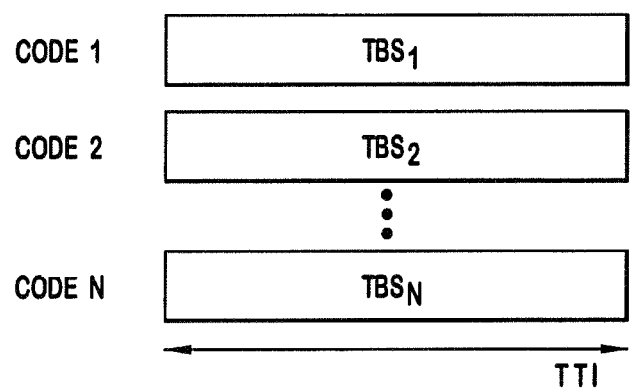
Figure 2C:
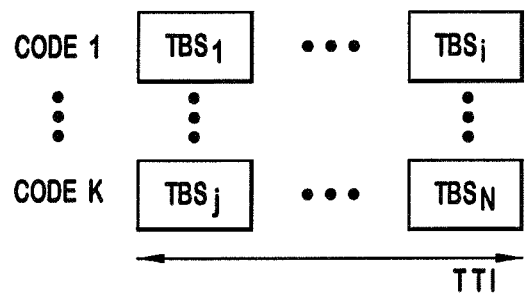
Figure 2D:
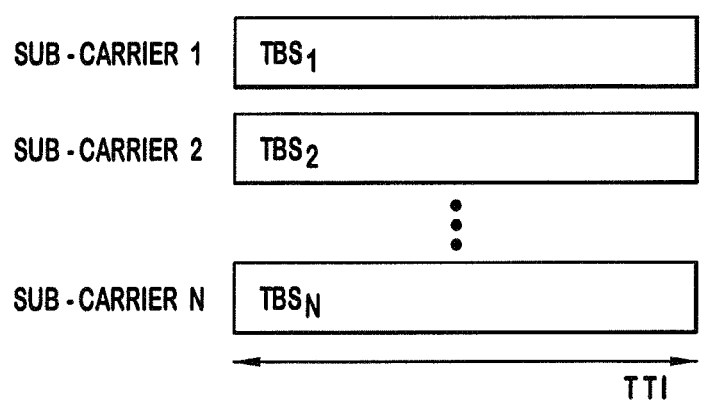

FIGS. 2A, 2B, 2C and 2D illustrate a TTI having multiple TBSs, $TBS_I$ to $TBS_N$. FIG. 2A illustrates multiple TBSs dividing a TTI by time, such as for use in a TDD/CDMA system. FIG. 2B illustrates multiple TBSs divided by codes, such as for use in a FDD/CDMA or TDD/CDMA system. FIG. 2C illustrates dividing multiple TBSs by time and codes, such as for use in TDD/CDMA system. FIG. 2D illustrates dividing multiple TBSs by sub-carriers, such as for use in an OFDM system. Each TBS is sized to allow transmission with the most robust modulation coding set for the allocated resources. To illustrate, the most robust MCS may only have the capacity to support a maximum 2,000 bit TBS within the TTI. Although referred to as the most robust modulation coding set, in practice, the most robust set may actually be a more robust set, if the most robust modulation coding set is unlikely to be needed. The least robust modulation and coding set may have the capacity to support a maximum of 20,000 bit TBS within the TTI. Although referred to as the least robust modulation coding set, in practice, the least robust set may actually he a less robust set, if the least robust modulation coding set is unlikely to be needed.

The TBS is sized, preferably, to allow for transmission with the most robust modulation and coding set within a TTI. Then when the least robust modulation and coding set is applied, multiple TBSs of this size are applied within the TTI to achieve maximum data rates, and when greater transmission reliability is required for successful delivery the most robust modulation and coding set can be applied.

Figure 3A:
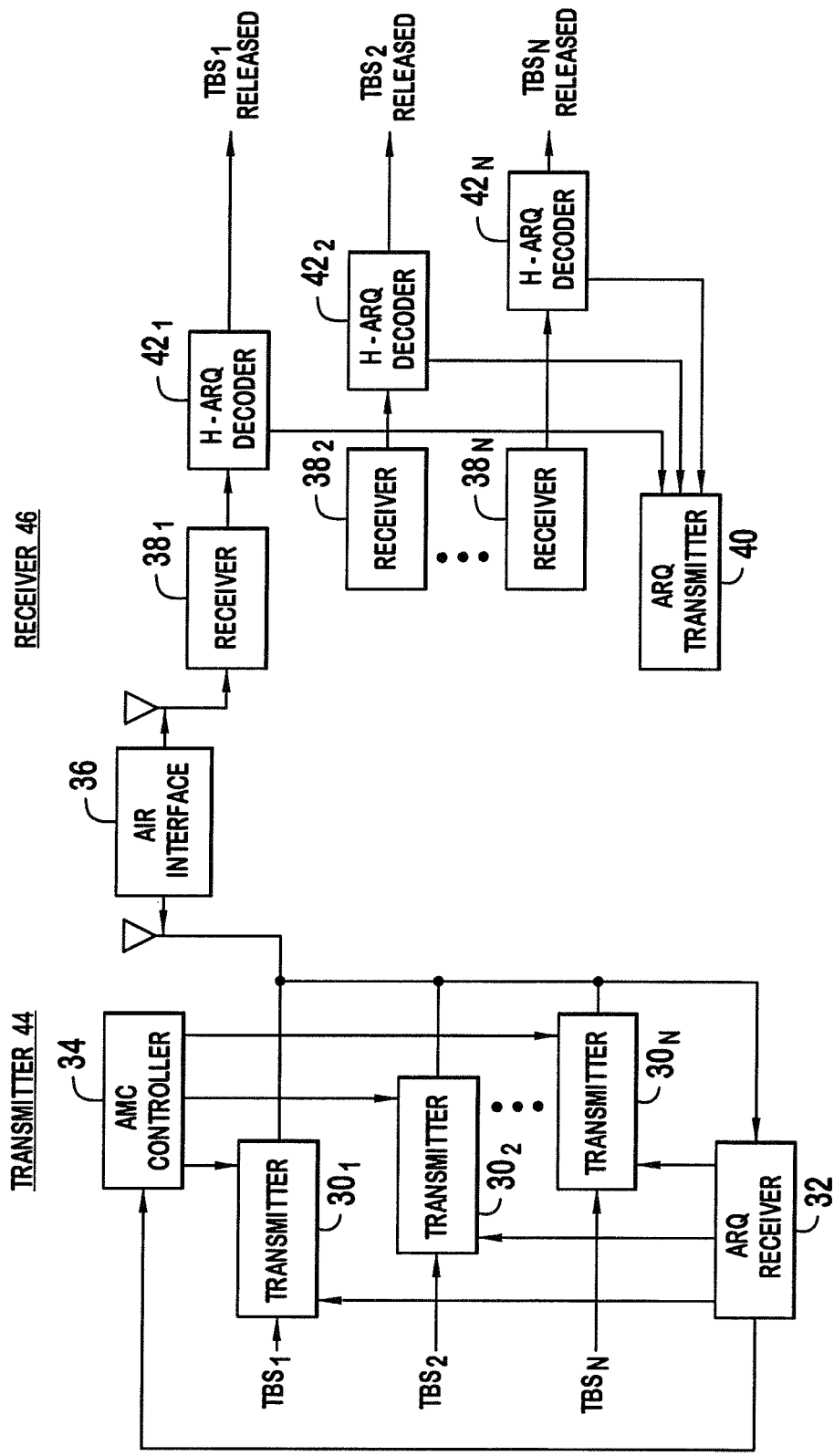
FIGS. 3A-3C are embodiments of a wireless H-ARQ communication system using AMC with TTIs capable of having multiple TBSs.

FIG. 3A is a simplified diagram of a transmitter 44 and receiver 46 for transmitting a TTI having one or multiple TBSs. The transmitter 44 may be located at either a user equipment or a base station/Node-B. The receiver 46 may be located at either a base station/Node-B or a user equipment. In current system implementations, AMC is typically only used in the downlink. Accordingly, the preferred implementation of transmission is for use in supporting AMC for the downlink. For other systems using AMC in the uplink, transport block set transmission can be applied to the uplink.

Figure 3B:
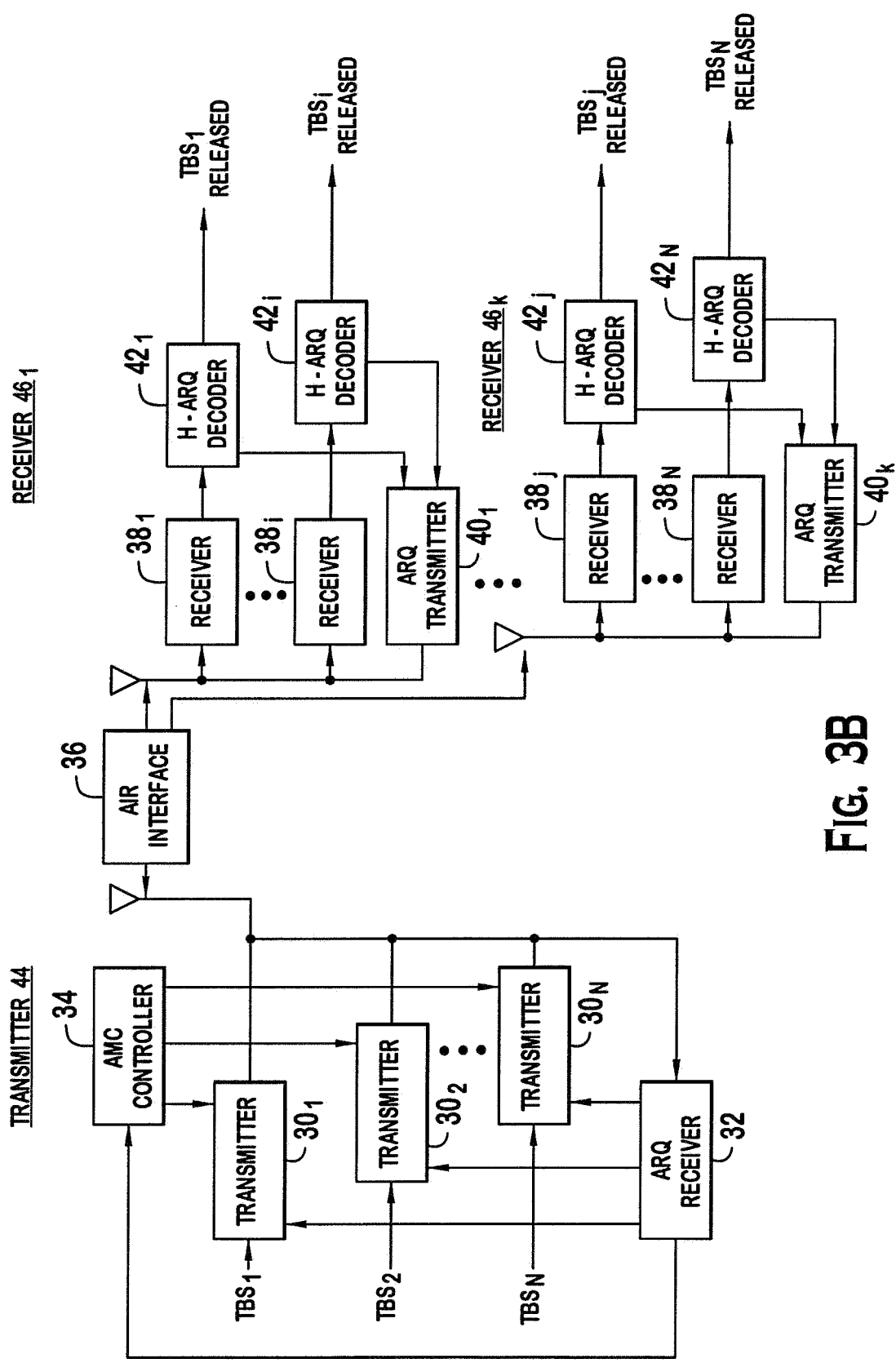
Figure 3C:
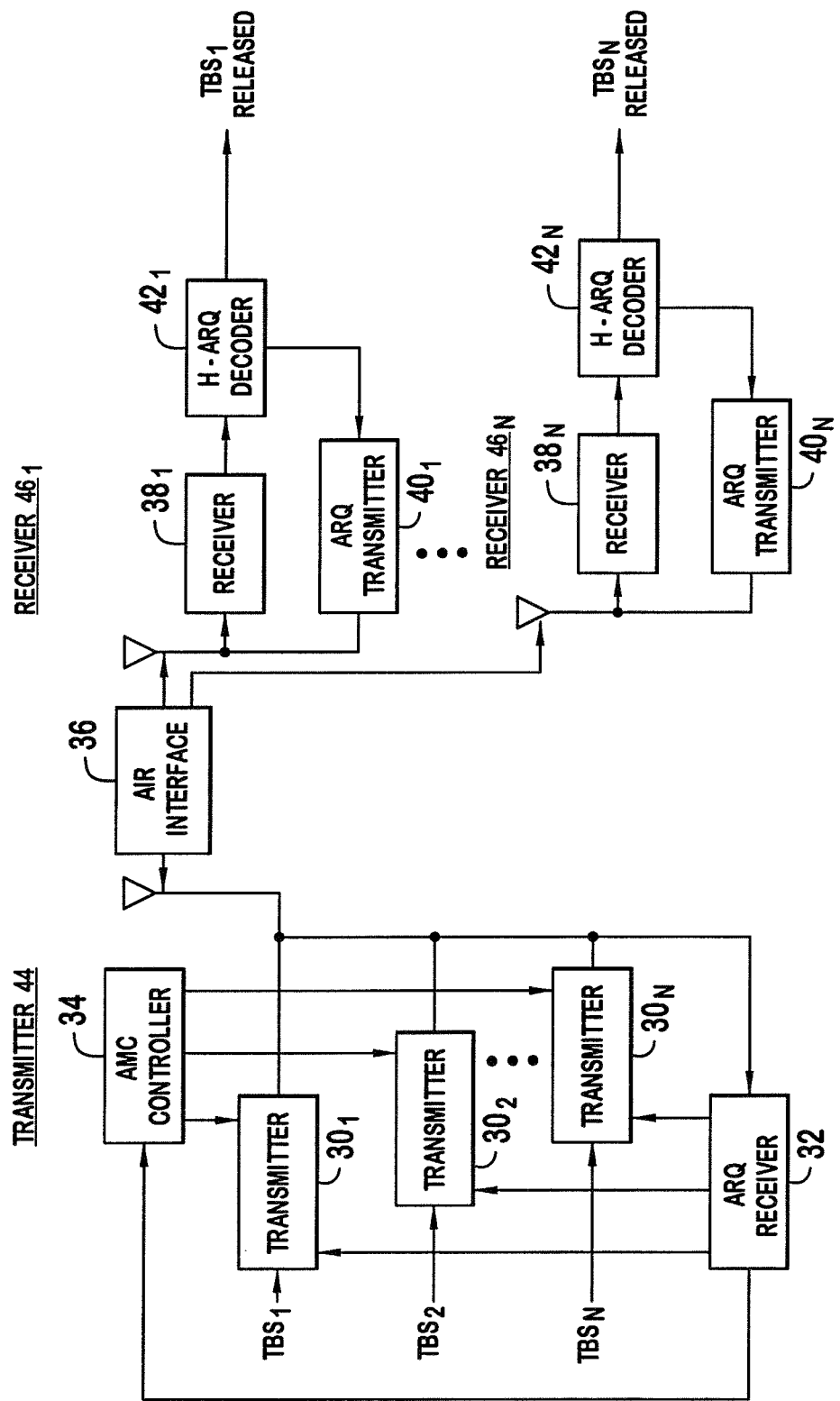

A transmitter $30_1$ to $30_N$ (30) transmits each TBS, $TBS_1$ to $TBS_N$, over the air interface 36. The number of TBSs in the TTI depends on the TBS size and the modulation and coding set used for transmission. If the most robust modulation and coding set is used to ensure successful delivery, the TTI may only support one TBS. If a lesser robust modulation and coding set is used to achieve higher effective data rates, multiple TBSs are sent in the TTI. Alternately, some TBSs may be destined for a different receiver $46_1$ to $46_K$ (46), as shown in FIG. 3B. Each TBS may also be sent to a different receiver $46_1$ to $46_N$ (46), as shown in FIG. 3C. This flexibility allows for greater radio resource utilization and efficiency.

A receiver $38_1$ to $38_N$ (38) receives each transmitted TBS. A H-ARQ decoder $42_1$ to $42_N$ (42) decodes each received TBS. Although in FIG. 3 one transmitter 30, receiver 38 and H-ARQ decoder 42 is shown for each TBS, one transmitter 30, receiver 38 and H-ARQ decoder 42 may handle all the TBSs. For each TBS failing the quality test, a request for retransmission is made by the ARQ transmitter 40. An ARQ receiver 32 receives the request and directs the appropriate TBS(s) to be retransmitted. The retransmitted TBS(s) are combined by the H-ARQ decoder(s) 42 and another quality test is performed. Once the TBS(s) passes the quality test, it is released for further processing. Since a TTI can contain multiple TBSs, preferably, a failure in one TBS does not necessarily require retransmission of the entire TTI, which more efficiently utilizes the radio resources.

Figure 4:
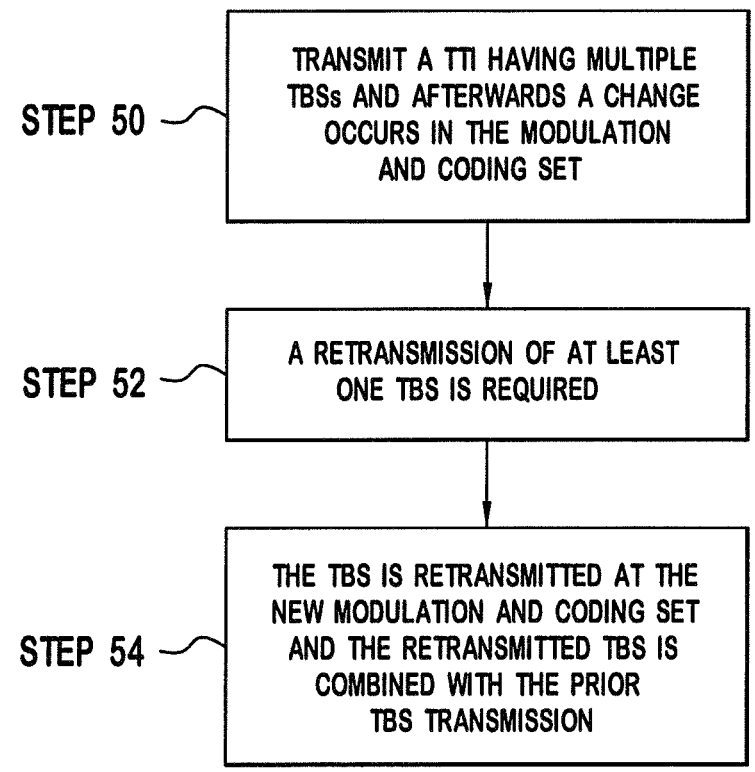
FIG. 4 is a flow chart of changing the modulation and coding set prior to a H-ARQ retransmission.
Figure 5:
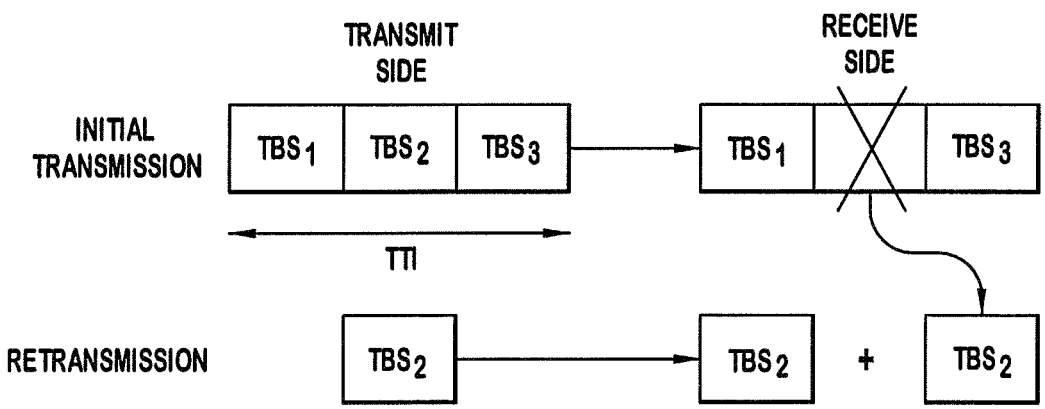
FIG. 5 is an illustration of changing the modulation and coding set prior to a retransmission of a single TBS.

An AMC controller 34 is also shown in FIGS. 3A, 3B and 3C. If the channel conditions change, the AMC controller may initiate a change in the modulation and code set used to transfer data. FIG. 4 is a flow diagram illustrating such a change occurring in AMC between retransmissions. A TTI is transmitted having multiple TBSs and afterwards, a change in the modulation and coding set occurs, (step 50). To illustrate using FIG. 5, a TTI has three TBSs, $TBS_1$, $TBS_2$ and $TBS_3$ applied at the least robust modulation and coding set to achieve the maximum data rate. The modulation and coding set in FIG. 5 changes so that only one TBS can be transmitted subsequently. Referring back to FIG. 4, at least one of the TBSs is received with an unacceptable quality and a retransmission is required, (step 52). In the illustration of FIG. 5, $TBS_2$ requires retransmission, as shown by a large "X". The TBS requiring retransmission is sent at the new modulation and coding set and combined with the prior TBS transmission, (step 54). As shown in FIG. 5, only $TBS_2$ is retransmitted and it is combined with the prior $TBS_2$ transmission. Although this example illustrates sending only one TBS at the more robust modulation and coding set, it is also possible that two TBSs could be transmitted with the more robust modulation and coding set within the TTI.

Figure 6:
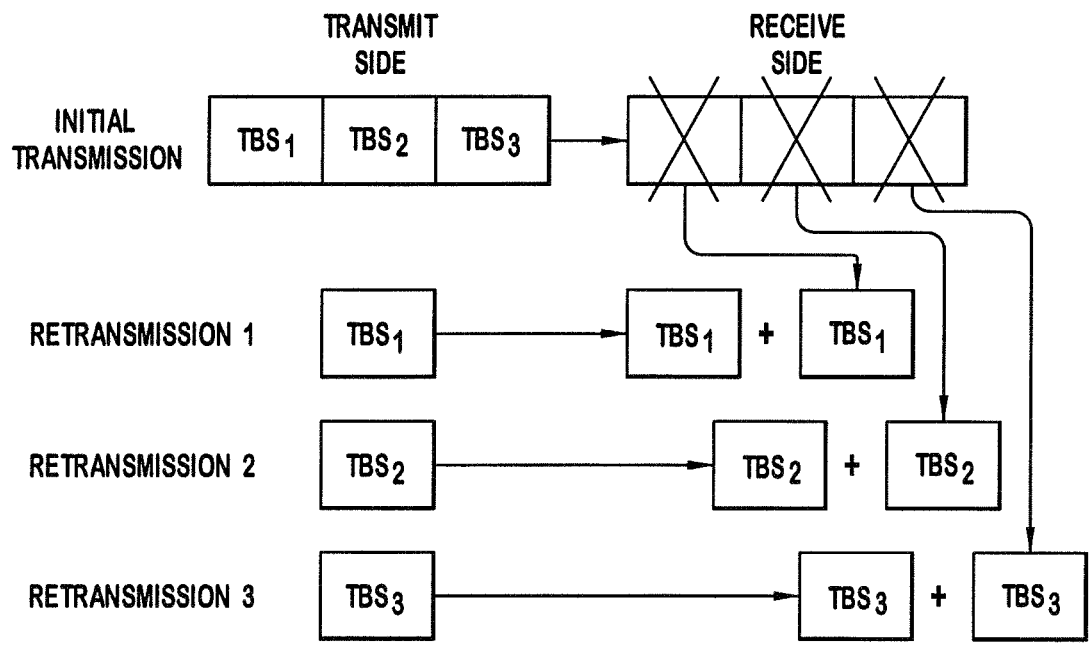
FIG. 6 is an illustration of changing the modulation and coding set prior to a retransmission of all three TBSs.

FIG. 6 is an illustration of multiple TBSs requiring retransmission. Three TBSs, $TBS_1$, $TBS_2$ and $TBS_3$, are transmitted in a TTI. A change in the modulation and coding set occurs such that only one TBS can be sent at a time. All three TBSs are received with an unacceptable quality. A request for retransmission is sent for all three TBSs. Sequentially, each TBS is retransmitted, as shown by retransmission 1, retransmission 2 and retransmission 3 in separate TTIs. The retransmitted TBSs are combined with the prior transmissions. A similar procedure is used, if two TBSs are transmitted with the more robust modulation and coding set within the TTI.

As illustrated, multiple TBSs allow for maximum data rates and incremental redundancy. A TTI can be transmitted at the least robust modulation and coding set achieving the maximum data rate and subsequent H-ARQ retransmission can be made at a more robust modulation and coding set ensuring greater probability for successful transmission. By allowing incremental redundancy, radio resources can be used more aggressively. A more aggressive (less robust) modulation and coding set can be used to achieve higher data rates and radio resource efficiency, since transmission can be made using a more conservative (more robust) set to maintain QOS, if channel conditions degrade.

Figures 7, 8:
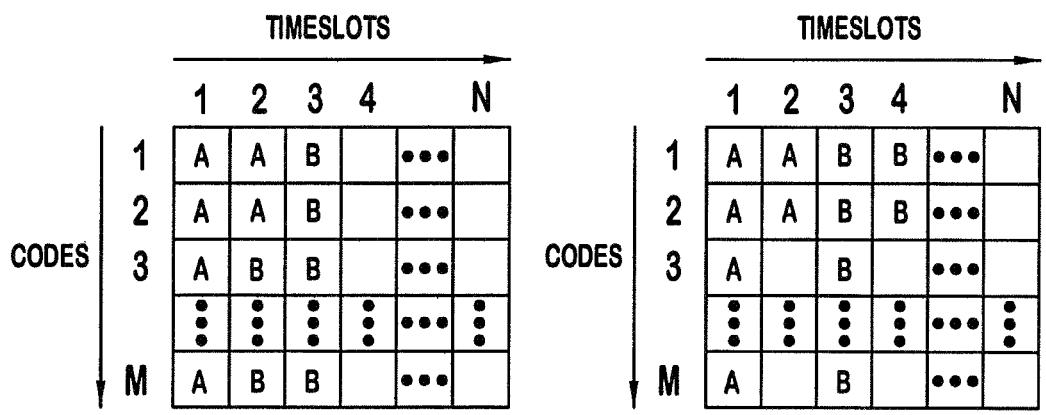
FIG. 7 is an illustration of overlapping TBSs in a TDD/CDMA communication system.
FIG. 8 is an illustration of non-overlapping TBSs in a TDD/CDMA communication system.

In a TDD/CDMA communication system, such as in the 3GPP system, two preferred approaches for implementing multiple TBSs within a TTI use either overlapping or non-overlapping time slots. In overlapping time slots, the TBSs may overlap in time. As illustrated in FIG. 7, a first TBS in a TTI uses the resource units having an "A" in them. A resource unit is the use of one code in a time slot. A second TBS has the "B" resource units. As shown in FIG. 7, in the second time slot, both the first and second TBS are transmitted. Accordingly, the two TBSs' transmissions overlap in time.

In non-overlapping TBSs, each time slot only contains one TBS of a TTI. As illustrated in FIG. 8, a first TBS ("A") is the only TBS in slots one and two. The second TBS ("B") is the only TBS in slots three and four.

In a FDD/CDMA communication system, such as in the third generation partnership project proposed system, transmissions occur simultaneously. In a FDD/CDMA system, preferably each TBS is assigned a different code/frequency pair for transmission. In an OFDM system, preferably each TBS is assigned a separate sub-carrier for transmission.

The invention claimed is:

1. An apparatus comprising:
one or more transmitters to transmit, a plurality of transport block (TB) sets in a first transmission time interval (TTI) over a third generation partnership project (3GPP) network air interface according to a first modulation and coding scheme (MCS); and
a controller, coupled with the one or more transmitters, to select a second MCS based on a channel condition, wherein at least one of the one or more transmitters is to retransmit, in a second TTI, a first TB of the plurality of TB sets according to the second MCS.

2. The apparatus of claim 1, wherein the first MCS comprises an M-ary quadrature amplitude modulation (QAM) and the second MCS comprises quadrature phase shift keying (QPSK).

3. The apparatus of claim 1, further comprising:
a receiver to receive, over the 3GPP network air interface, a negative acknowledgment (NACK) message associated with the first TB, wherein the controller is to select the second MCS based on the NACK message.

4. The apparatus of claim 3, wherein the receiver is further to receive, over the 3GPP network air interface, an acknowledgment (ACK) message associated with a second TB of the plurality of TB sets to indicate that the second TB does not require retransmission.

5. The apparatus of claim 1, wherein the one or more transmitters are to provide time division duplex with the plurality of TB sets being separated by time.

6. The apparatus of claim 1, wherein the one or more transmitters are to use a code division multiple access with the plurality of TB sets being separated by codes.

7. The apparatus of claim 1, wherein the one or more transmitters are to use code division multiple access with the plurality of TB sets being separated by time and codes.

8. The apparatus of claim 1, wherein the one or more transmitters are to use orthogonal frequency division multiple access with the plurality of TB sets being separated by sub-carriers.

9. An apparatus for communication over a third generation partnership project (3GPP) network air interface, the apparatus comprising:
one or more receivers to receive a plurality of transport block (TB) sets in a first transmission time interval (TTI); and
a transmitter to transmit a negative acknowledgment (NACK) to request a retransmission of a subset of the plurality of TB sets, wherein at least one of the one or more receivers is configured to receive the requested retransmission of the subset of the plurality of TB sets in a second TTI.

10. The apparatus of claim 9, further comprising:
a decoder to combine the subset of the plurality of TB sets received in the second TTI with the subset of the plurality of TB sets received in the first TTI.

11. The apparatus of claim 9, wherein the plurality of TB sets received in the first TTI comprises a first modulating and encoding scheme (MCS) and the subset of the plurality of TB sets received in the second TTI comprises a second MCS, the second MCS being different than the first MCS.

12. The apparatus of claim 9, wherein:
the one or more receivers are to
receive the plurality of TB sets in the first TTI on a first plurality of sub-carriers; and
the at least one receiver to receive the subset of the plurality of TB sets in the second TTI on a second plurality of sub-carriers, wherein the second plurality of sub-carriers are different than the first plurality of sub-carriers.

13. The apparatus of claim 9, wherein the transmitter is further to transmit an acknowledgment to indicate that one of the plurality of TB sets in the first TTI does not require a retransmission.

14. The apparatus of claim 9, wherein a determination to transmit the NACK is based upon a cyclic redundancy check (CRC).

15. A method comprising:
transmitting, over a first channel of a third generation partnership Project (3GPP) network air interface, at least a first transport block (TB) set and a second TB set in a first transmission time interval (TTI) using a first modulation encoding scheme (MCS);
receiving, over a second channel of the 3GPP network air interface, a request to retransmit the first TB set, and
retransmitting in response to the request the first TB set in a second TTI using a second MCS.

16. The method of claim 15, further comprising:
receiving, over the second channel, an acknowledgment that the second TB set does not require retransmission.

17. The method of claim 15, further comprising:
transmitting, over the first channel, cyclic redundancy check (CRC) bits associated with each of the first TB set and the second TB set.

* * * * *